United States Patent [19]

Smith

[11] Patent Number: 4,468,700
[45] Date of Patent: Aug. 28, 1984

[54] AUTOMATIC IRIS CONTROL LENS SYSTEM

[75] Inventor: William V. Smith, Memphis, Tenn.
[73] Assignee: Lectrolarm Custom Systems, Inc., Memphis, Tenn.
[21] Appl. No.: 475,557
[22] Filed: Mar. 15, 1983
[51] Int. Cl.³ ............................................... H04N 5/26
[52] U.S. Cl. .................................................... 358/228
[58] Field of Search ........................................ 358/228

[56] References Cited
U.S. PATENT DOCUMENTS

| | | |
|---|---|---|
| 2,885,471 | 5/1959 | King . |
| 2,898,536 | 8/1959 | Musolf . |
| 3,426,662 | 2/1969 | Sevin . |
| 3,496,289 | 2/1970 | Tanner . |
| 3,558,819 | 1/1971 | LaRue, Jr. . |
| 3,767,853 | 10/1973 | Bendell et al. . |
| 4,037,254 | 7/1977 | Monahan . |
| 4,158,859 | 6/1979 | Kerbel . |
| 4,190,864 | 2/1980 | Bischert . |
| 4,268,866 | 5/1981 | Rodgers . |
| 4,300,167 | 11/1981 | Miller et al. . |
| 4,409,620 | 10/1983 | Enomoto ............................. 358/228 |

*Primary Examiner*—Richard Murray
*Attorney, Agent, or Firm*—LeBlanc, Nolan, Shur & Nies

[57] ABSTRACT

During a scanning operation of a camera as the camera moves along its predetermined path, it is occasionally necessary to readjust the iris of the camera due to varying light conditions occurring over a period of time. A control mechanism is incorporated within the lens system of the camera for enabling intermittent automatic adjustment of the iris at one or more predetermined positions along the path of movement of the camera or at preselected time intervals during the scanning operation. A drive motor acts for driving the iris to vary the size of the iris and such drive motor operates in response to signals received from a motor control circuit. In order to generate signals for adjusting the iris the light from the scene being viewed by the camera, e.g. the light passing through the lens, is measured and compared with a predetermined standard. When a difference exists between the light passing through the iris and the predetermined standard, a control signal is provided to the motor control circuit for generating a signal for driving the iris drive motor. However, a switch mechanism is connected to the motor control circuit and the drive motor so as to only allow operation of the drive motor when the switch circuit is in its closed position. An actuating mechanism causes the switching circuit to be closed when the camera is at a predetermined position along the path of movement of the camera or at preselected time intervals during the scanning operation.

17 Claims, 5 Drawing Figures

AUTOMATIC IRIS CONTROL LENS SYSTEM

BACKGROUND OF THE INVENTION

The present invention relates to a lens system within a camera, such as a video camera, with an automatically adjustable iris which is automatically varied in size in response to the light passing through the iris.

The present invention is primarily concerned with automatic adjustment of the iris of video cameras utilized during a scanning operation such as when used for surveillance purposes. During such operation, over the period of a day, different light conditions necessitate readjustment of the iris independence upon varying light conditions within the area under surveillance. Numerous types of systems have been developed for automatically adjusting the iris continuously throughout the operation of the video camera.

Exemplary of the types of systems used for automatically adjusting the iris of a video camera are those systems disclosed in the following U.S. Pat. Nos.: 2,885,471 to King; 2,898,536 to Musolf; 3,426,662 to Sevin; 3,496,289 to Tanner; 3,558,819 to LaRue; 3,767,853 to Bendel et al.; 4,037,254 to Monahan; 4,158,859 to Kerbel; 4,190,864 to Dischert; 4,268,866 to Rodgers; and, 4,300,167 to Miller et al. All of the systems disclosed by these patents provide the same basic type of operation of measuring the light passing through the iris, comparing such light to a predetermined standard and continuously providing a feedback signal for varying the size of the iris in response to the difference between the light passing through the iris and the predetermined standard.

During numerous types of operations of a video camera. The continuous operation of the drive motor for readjusting the size of the iris leads to frequent burn out of the drive motor. Since the motor control is normally built into the lens section of the camera, this results in the entire lens section needing to be removed and replaced which results in both a breakdown in the system and a costly expense.

SUMMARY OF THE PRESENT INVENTION

An object of the present invention is to provide an improved lens system with an automatically adjustable iris for substantially minimizing burn out of the iris drive motor.

Another object of the present invention is to provide an improved lens system with an automatically adjustable iris that is controlled for intermittently adjusting the iris of the lens.

A further object of the present is to provide an improved lens system for a video camera in which the iris of the lens is automatically adjusted on an intermittent time basis or based on the position of the camera along its scanning path of movement.

A still further object of the present invention is to provide an improved lens system in which operation of the drive motor for automatically adjusting the iris of the lens in dependence upon light passing through the iris is only enabled when the camera is at certain preselected positions along the path of movement of the camera.

A still further object of the present invention is to provide an improved lens system in which the operation of the drive motor for automatically adjusting the iris of the lens in dependence upon light passing through the iris is only enabled at certain preselected time intervals during the scanning operation.

These objectives are achieved by the camera and lens system of the present invention. The camera is mounted for a scanning movement along a predetermined path and has a lens system that includes an automaticallyadjustable iris. A drive motor drives the iris for varying the size of the iris in response to signals received from a motor control circuit. A light sensing mechanism measures the light passing through the lens from the scene being viewed by the camera; while normally the light actually passing through the iris is measured, the light can be measured by a separate light meter external to the lens but directed to the same scene as the lens. The level of the light is then compared with a predetermined standard so as to provide a control signal to the motor control circuit when there is a difference between the level of the measured light and the predetermined standard. A switching mechanism is connected to the motor control circuit and the drive motor for enabling operation of the drive motor only when the switch mechanism is in its closed position. An actuating mechanism causes the switch mechanism to close at intermittent period during the scanning movement of the camera.

Actuation of the switching mechanism can be caused to occur either when the camera is at a preselected position or at several preselected positions along the path of movement of the camera or at preselected time intervals during operation of the camera. If the operation of the iris drive motor is to be controlled based upon when the camera is in certain preselected positions then the switching mechanism can include a switch which is magnetically or electromagnetically actuated. The actuating mechanism in turn includes a magnet or electromagnet which causes the switching member to close when it is in the vicinity of the particular magnet or electromagnet of the actuating mechanism.

Due to the flux fields generated by the magnet or electromagnet of the actuating mechanism, as the switching member enters the flux fields the switching member is closed and the iris drive motor is supplied with control signals and power for causing the iris to be automatically readjusted based upon the level of light entering the lens. As movement of the camera continues and the switching mechanism leaves the flux fields of the actuating mechanism operation of the iris motor will be interrupted. Once the camera has moved on and the switching mechanism has left the flux fields of the actuating mechanism, the iris will remain in the position to which it was set by the operation of the iris drive motor. The iris then will remain in such position until further movement of the camera again brings the switching member into the vicinity of the actuating mechanism which again enables the operation of the iris drive motor.

In accordance with the present invention the actuating mechanism can include either a single actuating member, e.g. a magnet or electromagnet, or a plurality of such actuating members positioned at various locations along the path of movement of the camera. If a plurality of actuating members are used, the switching member normally would be closed whenever the camera and the switching member moves into the vicinity of each of the individual actuating members. Alternatively, if electromagnetic actuating members are utilized, then it is possible to selectively activate any of the actuating members for determining at which locations the switching mechanism is closed and the iris motor is actuated for operation.

In an alternative mode of operation, the switching mechanism can be closed at intermittent time intervals instead of at preselected locations along the path of movement of the camera. Thus, a timing mechanism can be used for closing the switching mechanism and enabling operation of the iris drive motor at set time intervals, e.g. once or twice during the cycle of movement of the camera. Thus operation of the iris drive motor becomes time dependent instead of position dependent.

In either mode of operation, however, the iris drive motor is only operated on an intermittent basis.

DESCRIPTION OF THE PREFERRED EMBODIMENTS

Figure 1:
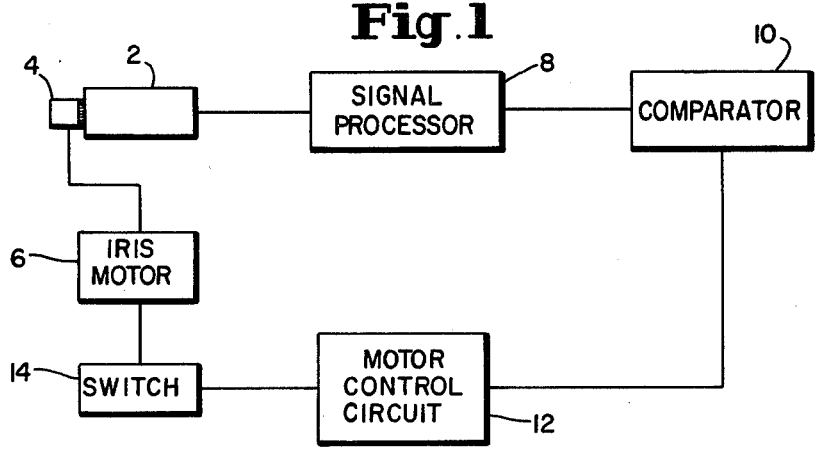
FIG. 1 is a block diagram of the system for intermittently, automatically adjusting the iris of the lens of a camera.

Camera 2 has a lens 4 with an adjustable iris that can be automatically adjusted by operation of iris motor 6. As shown in FIG. 1, camera 2 is connected to a signal processor 8 which is coupled to a light measuring element within camera 2 for providing an output signal indicative of the level of light passing through the lens. This output signal is provided to a comparator 10 which compares the signal indicative of the light passing through the lens with a predetermined standard. The output from comparator 10 is fed to a motor control circuit 12 which in turn controls the operation of iris motor 6. In practice, iris motor 6 along with signal processor 8, comparator 10 and motor control circuit 12 can be arranged within the housing of camera 2 or located within a casing adjacent to camera 2. The motor itself can be arranged either in camera 2 or as more typically occurs within the housing of lens system 4.

Figure 2:
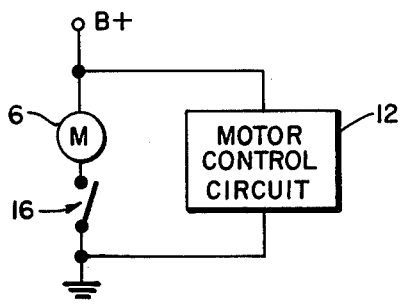
FIG. 2 is a block circuit diagram of the control circuit for driving the iris drive motor.

During the operation of camera 2 and its movement along a predetermined path, the light passing through the lens is measured on a continuous basis and signals fed through signal processor 8, comparator 10 and motor control circuit 12. Iris drive motor 6, however, is only operated when the switching circuit 14 is closed. Switching circuit 14 includes a switch 16 such as shown in FIG. 2 which is connected between iris drive motor 6 and ground. Thus while one side of the iris drive motor is connected to the B+ voltage as well as the motor control circuit, the motor is only capable of operating when switch 16 is closed and the motor is coupled to ground so as to complete the circuit.

Figure 3:
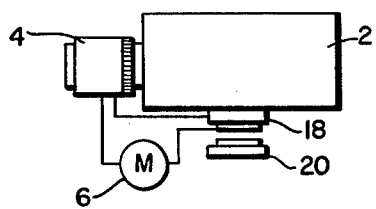
FIG. 3 is a schematic illustration of a camera with an iris drive motor and the switching and actuating mechanisms for controlling the operation of the iris drive motor.

Switch 16 can be arranged within a housing 18 placed on the bottom of camera 2 such as shown in FIG. 3. Switch 16 can be a magnetically or electromagnetically actuated relay switch which is closed as switch housing 18 moves over an actuating member 20. Actuating member 20 can be either a magnet or an electromagnet. Switch 16 is biased into a normally open position. As switch member housing 18 enters the magnetic flux field of actuating member 20, switch member 16 is caused to close and remains closed until the continued movement of camera 2 causes the switch member housing 18 to leave the magnetic flux fields of actuating member 20. When switch member housing 18 has left the magnetic flux field of actuating member 20, switch 16 returns to its open position. Only when switch 16 is closed will the signals from the motor control circuit result in the operation of iris drive motor 6 which in turn will cause the automatic adjustment of the iris within lens 4.

Figure 4:
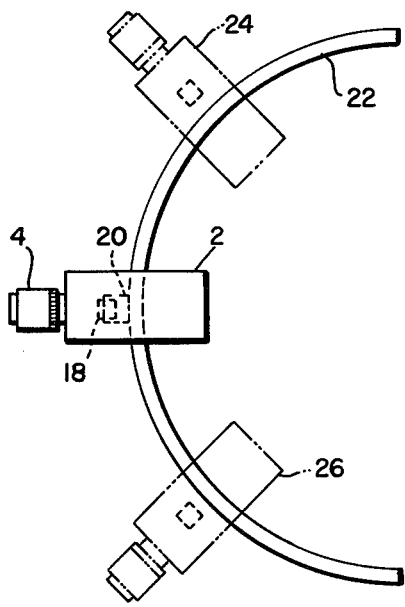
FIG. 4 is a schematic illustration showing when the iris drive motor would be actuated during the movement of a camera along a scanning path.

In FIG. 4, camera 2 is shown as being movable along a track 22. Thus camera 2 can continuously move back and forth along track 22 such as shown by the alternative positions represented by cameras 24 and 26. As the camera with its switch member housing 18 moves across actuating member 20 the iris drive motor is closed and the iris of lens 4 is automatically adjusted. When the camera is in its other positions along track 22 such as represented by cameras 24 and 26, switch member 16 is open and iris drive motor 6 is prevented for operating. Consequently, iris drive motor 6 is only operated on an intermittent basis.

Figure 5:
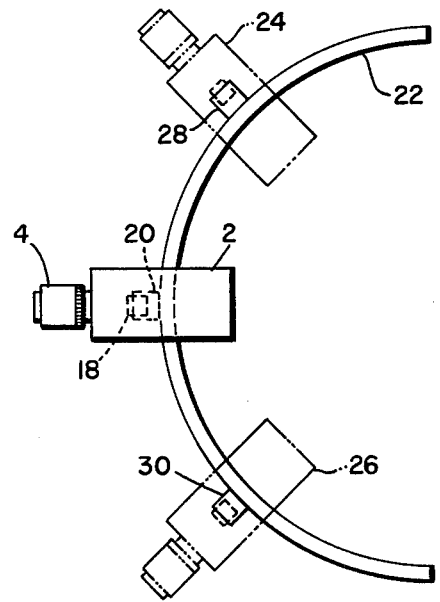
FIG. 5 is an alternative embodiment showing when the iris drive motor would be actuated during movement of the camera along a scanning path.

In an alternative embodiment, a plurality of actuating members such as shown by actuating members 20, 28 and 30 can be arranged along track 22 such as shown in FIG. 5. In this situation, switch 16 will be closed as switching member 18 enters the flux field of each of the actuating members. Consequently, switch 16 is closed and iris drive motor 6 activated when the camera is in the positions shown by cameras 2, 24 and 26 in FIG. 5.

In a further alternative embodiment, closure of switch member 16 can be controlled by a timing circuit. In such an embodiment, actuation of iris drive motor 6 would be time dependent instead of position dependent. However, here again iris drive motor 6 only would be intermittently operated during the scanning movement of camera 2 along its path of movement.

The present invention may be embodied in other specific forms without departing from the spirit or essential characteristics thereof. The present embodiments are presented merely as illustrative and not restrictive, with the scope of the invention being indicated by the attached claims rather than the foregoing descriptions. All changes which come within the meaning and range of equivalency of the claims are therefore intended to be embraced therein.

What is claimed is:

1. A lens system for a camera mounted for scanning movement along a predetermined path and having an adjustable iris and a mechanism for automatically adjusting the iris, said mechanism comprising:

a drive motor for driving said iris to vary the size of said iris;

motor control means for controlling the operation of said drive motor;

light sensing means for measuring light entering said lens system from a scene being viewed by the camera and providing a signal indicative of such measurement;

comparison means coupled to said light sensing means for comparing the signal indicative of the level of light entering said lens system to a predetermined standard and in response to a difference between such signal and the predetermined standard providing a control signal to said motor control means;

switch means connected to said motor control means and said drive motor, said switch means enabling operation of said drive motor only when said switch means is in its closed position; and, actuating means for closing said switch means only when the camera is at a preselected position along the path of movement of the camera.

2. A lens system according to claim 1 wherein said switch means is normally open and is arranged in the circuit between said drive motor and ground so that said motor only is connected to ground and is capable of operating when said switch means is closed.

3. A lens system according to claim 2 wherein said switch means is magnetically actuated and said actuating means includes magnetic means that causes said switch means to close when said switch means passes in the vicinity of said magnet of said actuating means.

4. A lens system according to claim 2 wherein said switch means is electromagnetically actuated and said actuating means includes electromagnetic means that causes said switch means to close when said switch means passes in the vicinity of said electromagnet of said actuating means.

5. A lens system according to claim 1 wherein said actuating means includes a plurality of means for causing said switch means to close at a corresponding plurality of preselected locations along the path of movement of the camera.

6. A lens system according to claim 5 wherein said switching means is magnetically actuated and each of said plurality of means of said actuating means includes magnetic means that causes said switch means to close when said switch means passes in the vicinity of any of said magnetic means of said actuating means.

7. A lens system according to claim 5 wherein said switch means is electromagnetically actuated and each of said plurality of means of said actuating means includes electromagnetic means that causes said switch means to close when said switch means passes in the vicinity of any of said electromagnetic means of said actuating means that have been actuated.

8. A camera system comprising:
a camera having a lens with an adjustable iris and a mechanism for automatically adjusting said iris;
means for causing said camera to move along a predetermined path for conducting a scanning operation;
a drive motor for driving said iris to vary the size of said iris;
motor control means or controlling the operation of said drive motor;
light sensing means for measuring the light entering said lens from a scene being viewed by said camera and providing a signal indicative of such measurement;
comparison means coupled to said light sensing means for comparing the signal indicative of the level of light entering said lens to a predetermined standard and in response to a difference between such signal and the predetermined standard providing a control signal to said motor control means;
switch means connected to said motor control means and said drive motor, said switch means enabling operation of said drive motor only when said switch means is in its closed position; and,
actuating means for closing said switch means only when said camera is at a preselected position along the path of movement of the camera.

9. A camera system according to claim 8 wherein said switch means is normally open and is arranged in the circuit between said drive motor and ground so that said motor only is connected to ground and is capable of operating when said switch means is closed.

10. A camera system according to claim 9 wherein said switch means is magnetically actuated and said actuating means includes magnetic means that causes said switch means to close when said switch means passes in the vicinity of said magnet of said actuating means.

11. A camera system according to claim 9 wherein said switch means is electromagnetically actuated and said actuating means includes electromagnetic means that causes said switch means to close when said switch means passes in the vicinity of said electromagnet of said actuating means.

12. A camera system according to claim 8 wherein said actuating means includes a plurality of means for causing said switch means to close at a corresponding plurality of preselected locations along the path of movement of the camera.

13. A camera system according to claim 12 wherein said switch means is magnetically actuated and each of said plurality of means of said actuating means is a magnetic means that causes said switch means to close when said switch means passes in the vicinity of any of said magnetic means of said actuating means.

14. A camera system according to claim 13 wherein said switch means is electromagnetically actuated and each of said plurality of means of said actuating means includes electromagnetic means that causes said switch means to close when said switch means passes in the vicinity of any of said electromagnetic means of said actuating means that have been actuated.

15. A lens system for a camera having an adjustable iris and a mechanism for automatically adjusting the iris, said mechanism comprising:
light sensing means for measuring light entering said lens system and providing a signal indicative of such measurement;
a drive motor means for driving said iris to vary the size of said iris and coupled to said light sensing means for varying the size of said iris in dependence upon the level of the light entering said lens system;
switch means connected to said drive motor means, said switch means enabling operation of said drive motor means only when said switch means is in its closed position; and,
actuating means intermittently closing said switch means, said actuating means intermittently closes said switch means at a preselected position along the path of movement of the camera.

16. A lens system according to claim 15 wherein said switch means is normally open and is arranged in the circuit between said drive motor and ground so that said motor only is connected to ground and is capable of operating when said switch means is closed.

17. A lens system for a camera having an adjustable iris and a mechanism for automatically adjusting the iris, said mechanism comprising:
light sensing means for measuring light entering said lens system and providing a signal indicative of such measurement;

a drive motor means for driving said iris to vary the size of said iris and coupled to said light sensing means for varying the size of said iris in dependence upon the level of the light entering said lens system;

switch means connected to said drive motor means, said switch means enabling operation of said drive motor means only when said switch means is in its closed position; and, actuating means intermittently closing said switch means, said actuating means intermittently closes said switch means at a preselected position along the path of movement of the camera, said actuating means includes means for causing said switch means to close at preselected time intervals for measuring all of the light entering said lens system from an entire scene seen by said lens system.

* * * * *